United States Patent Office 3,347,955
Patented Oct. 17, 1967

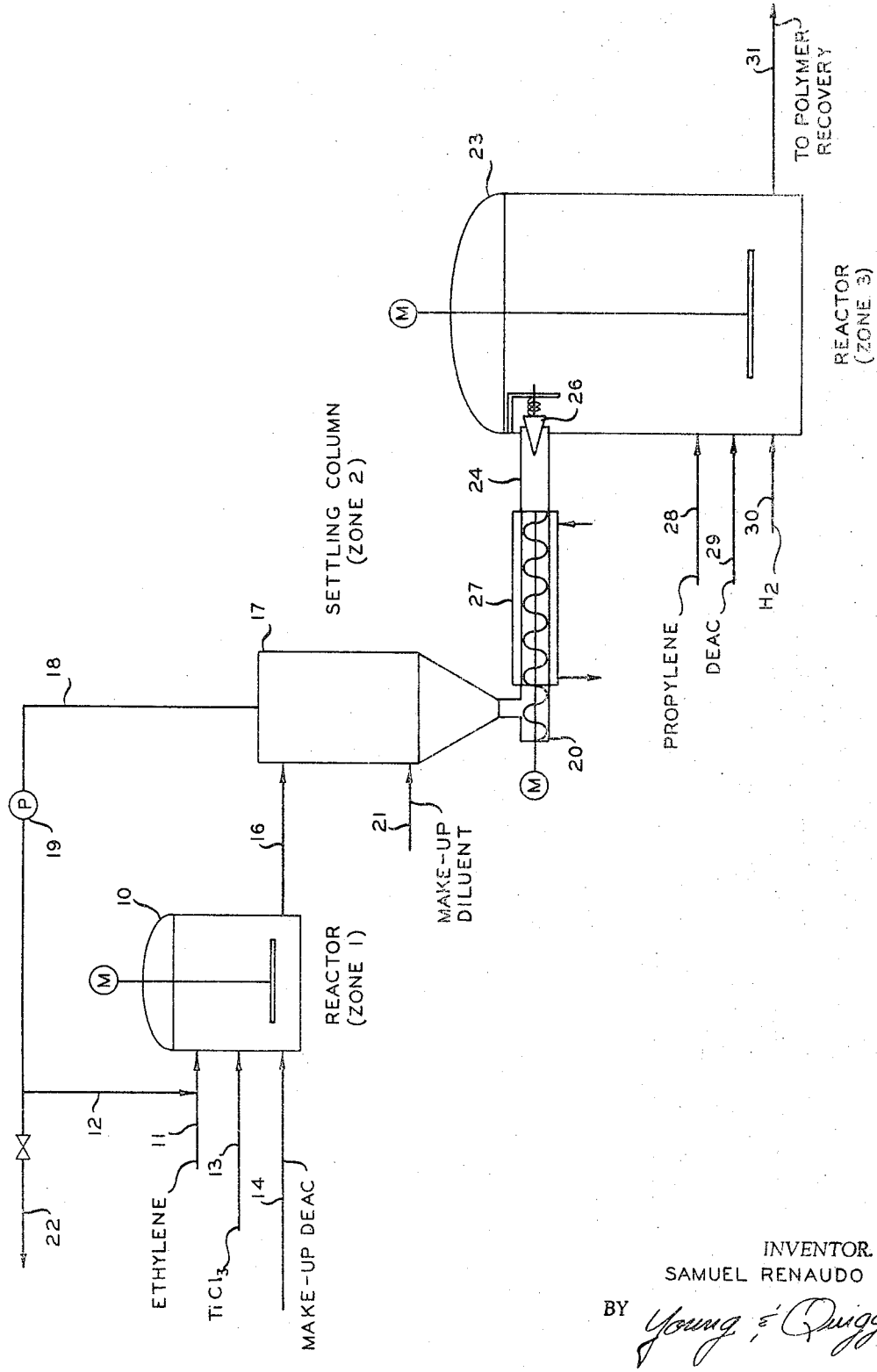

3,347,955
PROCESS FOR MAKING BLOCK POLYMERS OF OLEFINS
Samuel Renaudo, Bartlesville, Okla., assignor to Phillips Petroleum Company, a corporation of Delaware
Filed July 24, 1964, Ser. No. 384,870
3 Claims. (Cl. 260—878)

This invention relates to apparatus for the block copolymerization of olefins in a continuous operation. In another aspect it relates to a method of copolymerizing two different mono-1-olefins in the substantial absence of each other.

It is known that mono-1-olefins can be polymerized sequentially in such a manner that the polymer molecules contain distinct polymer segments or blocks which are non-identical and which contribute significantly to the properties of the total polymer. The preparation of block copolymers is described in British patent specification No. 889,659 of Phillips Petroleum Company. One type of polymer which can be made in accordance with the procedure described is a polymer in which each block is made up essentially of only one type of monomer. In this case the polymerization of each monomer is carried out in the substantial absence of a different monomer. It has been found that very valuable properties can be obtained by copolymerizing mono-1-olefins in this manner and that similar results cannot be realized by making physical blends of different homopolymers based on the same monomers and combined in the same proportions. For example, block copolymers of ethylene and propylene can be prepared so that the polymer molecules contain a polyethylene block and a polypropylene block. This product has much better impact strength and low temperature properties than does a physical blend of polyethylene and polypropylene of the same proportions of ethylene and propylene.

Although block copolymers of the type described above can be readily prepared on a laboratory scale, in continuous commercial operations many problems are involved which are not present in conventional processes directed to the formation of homopolymers or random copolymers of the same monomers. One of the difficulties lies in obtaining complete removal of unreacted monomer or consumption of all of the monomer which is used first so that it will not be present in the system when the second monomer is polymerized. Another very critical problem is that of maintaining the first polymer and the catalyst associated therewith in an active state so that when the second monomer is polymerized, the second block is added to the molecules of the first polymer. If the first polymer is inactivated during the procedure in which the monomers are being changed, the result obtained is merely a physical blend of independent homopolymer molecules so that the advantages of block copolymerization as discussed above are not realized. On a laboratory scale these difficulties can easily be overcome by using the same polymerization catalyst and diluent for the polymerization of both monomers, the first monomer being either completely consumed or any unreacted monomer being removed from the polymerization mixture by vaporization. On a commercial scale, however, carrying out the first polymerization to completion may require an unduly long residence time. Also, the complete removal of monomer by vaporization, even where an inert gas is used for stripping purposes, is an expensive and time-consuming operation.

I have discovered that block copolymers of mono-1-olefins can be made conveniently on a continuous basis so that the polymerization of each olefin is carried out in the substantial absence of the other using a coordination catalyst system formed from at least two components, a first of which is a compound of a metal of Groups IV-B, V-B, VI-B or VIII of the Periodic Chart and the second of which is a reducing agent based on a metal of Groups I-A, II-A or III-A. (Periodic Chart of the Elements by H. G. Deming, Lange's Handbook of Chemistry, Sixth Edition, Handbook Publishers, Inc., Sandusky, Ohio, 1946.) According to the procedure of my invention, the first mono-1-olefin is polymerized in the presence of the catalyst system and an inert liquid hydrocarbon diluent under conditions which form a polymer slurry. The diluent is then removed from the polymer while maintaining the polymer in an environment which is inert with respect to said first catalyst component. This is preferably done by permitting the polymer to settle in a quiescent zone and then compressing the polymer in an enclosed volume so that the diluent is expressed from the polymer and forced back into said quiescent zone. I have discovered that most of the diluent and substantially all of the unreacted monomer can be removed from the polymer in this way while still keeping the polymer and associated catalyst alive for further polymerization. The polymerization is then continued in a second stage where the first polymer thus freed of diluent and monomer is contacted with the other olefin maintained in the liquid phase. More of the second catalyst component which is the reducing agent is added to the second polymerization stage, but only the reducing agent component is added since the essential residue of the first component remains associated with the first formed polymer.

The apparatus which is provided by my invention includes, in combination, a first reactor with means for feeding monomer and catalyst thereto, a settling column, conduit means connecting the outlet of the first reactor with an upper portion of said column, a recycle conduit connecting the top portion of said column with an inlet to said first reactor, a second reactor, an auger conveyor connected to receive polymer solids from the bottom of said column and transfer same to said second reactor, means for feeding a second monomer and one catalyst component to said second reactor, and means for withdrawing a product stream from said second reactor. By locating the settling column below the first reactor with conduit means connecting the top of said column with the bottom of said reactor, this conduit means can serve to feed polymer solids to the column and also to recycle diluent and monomer carried out of the reactor with the polymer. As an additional feature in the apparatus aspect of my invention, there is provided a restriction in the outlet of the auger conveyor in order to cause a back pressure within the conveyor so that the polymer solids are compressed as they are being conveyed from the settling column to the second reactor. I also prefer to provide means for heating the upstream portion of said conveyor in order to vaporize any monomer which is still associated with the polymer solids. As a further improvement, means for introducing a diluent to the lower portion of the settling column is provided. All of the make-up diluent can be added to the first reactor in this manner, this diluent serving to wash monomer from the polymer solids as they settle in the column.

It is an object of my invention to provide apparatus suitable for the continuous block copolymerization of mono-1-olefins, each in the substantial absence of the other.

It is another object of my invention to provide a method of sequentially polymerizing mono-1-olefins in the absence of each other so that a product having improved impact strength and low temperature brittleness is obtained.

Another object is to provide apparatus and procedure for continuously copolymerizing ethylene and propylene sequentially so that the propylene is polymerized in the presence of the polymerized ethylene but in the substantial absence of ethylene monomer.

Another object is to provide a method of block copolymerizing ethylene and a higher mono-1-olefin using a minimum of inert reaction diluent for the total operation.

Other objects, advantages, and features of my invention will be apparent to those skilled in the art from the following discussion and drawing which is a schematic flow diagram of the process and apparatus features of my invention.

The present invention is of greatest value as applied to the block copolymerization of ethylene and propylene where the ethylene is polymerized first and then the propylene is polymerized in the presence of the polyethylene. The invention can be used, however, for the block copolymerization of two or more mono-1-olefins having from 2 to 8 carbon atoms such as 1-butene, 1-pentene, 4-methyl-1-pentene, 1-octene, and the like.

The catalyst which is employed can be any of the catalyst systems commonly referred to as coordination polymerization catalysts Such catalysts are formed from at least two components, one of which is a compound of a metal selected from Groups IV–B, V–B, VI–B or VIII of the Periodic Chart, and the second component is a reducing agent, normally an organometal, metal hydride, or metal of Groups I–A, II–A or III–A. These catalyst systems are well known and many examples are available from the literature. Examples of component combinations which are representative include n-butyllithium and titanium tetraiodide; dicyclopentylzinc and titanium butoxide; ethylmagnesium bromide and titanium hydride; triethylaluminum or triphenylaluminum and molybdenum pentachloride; sodium hydride, barium hydride or gallium hydride and iridium chloride; sodium, magnesium or aluminum and vanadium tetrachloride, and the like.

The catalyst systems used in this invention must, of course, be capable of polymerizing mono-1-olefins in mass polymerization and under conditions such that solid polymer is produced in particle form. Preferably the catalyst components include a metal salt and an organometal compound as the reducing agent. A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from 0 to 2, inclusive, and the sum of $m$ and $n$ is equal to the valence of the metal M, and (b) a halide of a metal of Group IV–B, V–B, VI–B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ include triethylaluminum, triisobutylaluminum, triphenylaluminum, triethylgallium, tricyclohexylgallium, tri-n-butylindium, triethylthallium, diethylaluminum hydride, ethylaluminum dichloride, diethylaluminum chloride, phenylgallium dibromide, eicosyl aluminum diiodide, di-(3-phenyl-1-methylpropyl)indium chloride, and the like.

Preferably the metal salt is a metal halide of a Group IV–B metal, namely titanium, zirconium, hafnium or germanium. These solids include both the tri- and tetrachlorides, bromides and iodides and can be used individually or as mixtures of two or more metal halides. The preferred salt is titanium trichloride and the preferred catalyst system is diethylaluminum chloride plus the reaction product of aluminum and titanium tetrachloride, said reaction product having the approximate formula $TiCl_3 \cdot 1/3 AlCl_3$.

In these catalyst systems, the mole ratio of the reducing agent to the metal salt is usually in the range of 1:1 to 10:1, and preferably in the range of 2:1 to 5:1. Concentration of the catalyst in the polymerization zone is normally in the range of 0.01 to 5 weight percent based on the monomer charged to that zone, although greater or lesser amounts can be used. In the polymerization of the first monomer, an inert liquid hydrocarbon diluent is used, including the paraffins and cycloparaffins having from 3 to 12 carbon atoms per molecule such as propane, n-butane, n-hexane, n-heptane, n-dodecane, isooctane, cyclopentane, cyclohexane, and the like.

Polymerization conditions are maintained in both polymerization stages so that the polymer is formed as a solid particle and the reaction mixture is a slurry of solid polymer and liquid diluent or liquefied monomer. Suitable polymerization temperatures can vary from about 0 to 200° F. and are preferably maintained in the range of about 90 to 150° F. The pressure is that required to maintain the reaction medium in the liquid phase although higher pressures can be used.

In order to describe the invention more fully, reference is now made to the drawing where the process is depicted for the block copolymerization of ethylene and propylene. The polymers of this type which have been found to be most valuable in that they have a good combination of physical properties are polymers which contain a major proportion of propylene and a minor proportion of ethylene, for example from about 1 to 40 weight percent ethylene and 60 to 99 weight percent propylene. It is advantageous, therefore, to polymerize the ethylene first since at this stage the requirements for reactor size are smaller. As shown in the drawing, a reactor 10 is provided for the homopolymerization of ethylene which is fed continuously to the system through conduit 11. The ethylene is dissolved in diluent such as normal pentane which is added through recycle line 12. This diluent also contains recycle ethylene. The catalyst components, namely titanium trichloride and diethylaluminum chloride, are added to reactor 10 through conduits 13 and 14, respectively. Since the recycle stream in conduit 12 also contains diethylaluminum chloride, only a make-up quantity need be added through line 14. The reactor 10 which represents reaction Zone 1 can be any type of commercial polymerization reactor such as a stirred vessel or a pipe loop reactor.

The polymerization effluent from reactor 10 which includes polyethylene particles, unreacted ethylene, diluent and catalyst is passed via conduit 16 to settling column 17, indicated as Zone 2 of the operation. This reaction mixture is fed to the upper portion of the settling column so that the polymer solids which are of greater density than the diluent are permitted to gravitate toward the bottom of the column while the diluent with unreacted ethylene and dissolved diethylaluminum chloride is removed from the top of the column through conduit 18 and passed by pump 19 into recycle conduit 12 and thence back to reactor 10.

Quiescent conditions are maintained in column 17 so that the polymer solids settle to the bottom thereof and are removed through an outlet at the bottom of the column passing into auger conveyor 20. Make-up diluent is added at a lower portion of column 17 through conduit 21, this make-up diluent serving to wash ethylene from the polymer solids as they settle in column 17. In order to prevent the build-up of impurities in reactor 10, it may be necessary to withdraw a purge stream from the recycle stream in conduit 12. This stream can then be passed through conduit 22 to suitable solvent purification steps.

The polymer solids which enter conveyor 20 are passed through the conveyor to reactor 23. Conveyor 20 includes a downstream portion 24 into which the auger does not extend. A restriction is maintained at the outlet of conveyor 20, this restriction being illustrated in the drawing as a spring-loaded cone 26 which creates a back pressure within the conveyor and forces the build-up of a relatively solid polymer plug in portion 24 of the conveyor. The pressure of the auger forcing the polymer solids against this back pressure causes the solids to be pressed together, thereby expressing diluent from the solids, this diluent flowing back into settling column 17. In order to assist the removal of diluent at this point, the upstream portion of conveyor 20 can be heated by circulating a suitable heat exchange medium through jacket 27. The temperature in this portion of the conveyor should not exceed 200° F. but heating the polymer at this point helps to vaporize any unreacted ethylene which may still be dissolved in diluent wetting the surfaces of the polymer solids.

The second stage of the polymerization is carried out in reactor 23 indicated as Zone 3 wherein the polyethylene solids are contacted with liquid propylene entering the reactor through conduit 28. The active residue of the titanium trichloride which was added to reactor 10 remains associated with the polymer particles so that it is not necessary to add this component of the catalyst system. In fact, fresh titanium trichloride should not be added in order that all of the polymerization of the propylene be initiated by the catalyst residue which is associated with the preformed polyethylene. Since the reducing agent is dissolved in the hydrocarbon diluent which is removed from the polymer in Zone 2, additional diethylaluminum chloride is added to reactor 23 through conduit 29. Also, hydrogen can be added at this point through conduit 30 for molecular weight control. The amount of hydrogen used in this manner is preferably about 0.05 to 0.5 mol percent based on the propylene. Reactor 23, like reactor 10, can be any type of polymerization reactor. The polymerization product which includes both polymerized ethylene and propylene is removed from reactor 23 and passed to conventional polymer recovery steps through conduit 31.

The residence time in Zone 1 is that necessary to obtain the desired amount of polymerized ethylene in the end product. Normally this residence time is in the range of about 15 to 150 minutes. The partial pressure of ethylene in Zone 1 is about 10 to 400 p.s.i.g., preferably 20 to 150 p.s.i.g. The effluent from Zone 1 contains a relatively high percentage of polymer particles, for example about 30 to 35 weight percent. This polymer also contains substantially all of the titanium trichloride portion of the catalyst. The slurry which is passed from the bottom of the settling zone into the auger conveyor contains about 60 to 90 percent polymer solids and it is possible to remove substantially all of the ethylene and hydrocarbon diluent from the polymer by the time it is passed into Zone 3. For example, polymer solids containing only about 0.01 weight percent hydrocarbon diluent can be obtained by the procedure of this invention and are thereby essentially free of unreacted ethylene. By separating the polymer from the diluent in this manner, however, the polymer is passed to Zone 3 in an active form so as to permit continuation of the polymerization with propylene to form the block copolymer. Normally a reaction period of about 15 to 150 minutes is suitable for the second polymerization stage. This reactor is preferably operated liquid full.

Not only does the present invention provide a convenient method of removing the unreacted monomer from the first prepared polymer, but it also frees the polymer from inert diluent so that the second stage of the polymerization can be carried out in the liquid monomer. This greatly simplifies the second polymerization operation since inert diluent is avoided and need not be recovered and separated in the polymer recovery operation. Propylene can be separated from the polymer and recycled directly to the Zone 3 reactor. These recovery steps as well as the polymer finishing operations are conventional.

In order to illustrate further the advantage of my invention, the following example is presented. The materials, conditions and proportions are typical only in this example and should not be construed to limit my invention unduly.

*Example*

Ethylene was polymerized in a first stage using an inert diluent of n-heptane, a reaction temperature of 130° F. and a pressure of 150 p.s.i.g. The catalyst employed was diethylaluminum chloride plus the reaction product of aluminum and titanium tetrachloride ($TiCl_3 \cdot 1/3 AlCl_3$) in a mole ratio of 2:1. The residence time was 60 minutes after which the liquid normal heptane containing dissolved unreacted ethylene was physically separated from the polyethylene solids. The polymer was then contacted with liquid propylene and additional diethylaluminum chloride to restore the ratio used in the first stage. Also 0.1 mole percent hydrogen based on the propylene was added. The reaction was continued at 130° F. at a pressure of 400 p.s.i.g. The properties of the recovered polymers from several runs and the residence times in the second stage reactor are shown in the following table. For comparison purposes a homopolymer of propylene was made under similar conditions but not in the presence of preformed polyethylene. Properties of this product are shown as Run 4. Also for comparison, the properties of a blend of polyethylene and polypropylene in the weight ratio of 15 to 85 are shown as Run 5.

TABLE

| Run No. | Wt. Percent of Total Product Made in First Zone | Residence Time in Second Stage, Min. | Impact Strength, ft.-lb.[a] | Brittleness Temp. °F[b] |
| --- | --- | --- | --- | --- |
| 1 | 11.6 | 160 | 4.93 | 47 |
| 2 | 20.1 | 80 | 7.87 | 29 |
| 3 | 27.0 | 80 | 11.72 | −3 |
| 4 | [c] 0 | 120 | 2.13 | 105 |
| 5 | [d] 0 |  | 1.63 | >102 |

[a] ASTM D 256-53, °F., no notch.
[b] ASTM D 746-57T.
[c] Polypropylene.
[d] Blend, 15/85 polyethylene/polypropylene.

The above data show that the polymers prepared according to the procedure of this invention had substantially higher impact strength and lower brittleness temperatures than polypropylene or a physical blend of polypropylene and polyethylene.

An attempt was made to duplicate the results of this invention by precipitating preformed polyethylene onto particles of titanium trichloride. Polyethylene was dissolved in n-heptane containing the $TiCl_3 \cdot 1/3 AlCl_3$ reaction product in finely dispersed form. The solution was cooled to precipitate the polyethylene which was then separated from the n-heptane and mixed with liquid propylene and diethylaluminum chloride. Propylene was polymerized and the product recovered. A product containing 43 weight percent polyethylene had an impact strength of 1.28 foot pounds and a brittleness temperature above +75° F. These results show that an entirely different block-type copolymer is formed by the present invention.

As will be apparent to those skilled in the art, various modifications can be made in this invention without departing from the spirit or scope thereof.

I claim:

1. A method of making a block copolymer of ethylene and a higher mono-1-olefin wherein each monomer is polymerized in the substantial absence of the other which comprises contacting ethylene in a first reaction zone with a coordination catalyst system formed from a Group IV–B metal halide and a Group III–A metal organometallic reducing agent in the presence of an inert liquid hydrocarbon diluent under polymerization conditions thereby forming a slurry containing solid polyethylene, unreacted ethylene and said diluent, passing said slurry to a settling zone, adding diluent near the bottom of said settling zone, withdrawing diluent and ethylene from the upper portion of said settling zone, recycling thus withdrawn diluent and ethylene to said first reaction zone, passing polyethylene solids from the lower portion of said settling zone into a compression zone, to remove diluent and unreacted monomer, maintaining a back pressure at the outlet of said compression zone to form a relatively solid polymer plug in the downstream portion of said compression zone, passing polyethylene substantially free of diluent and ethylene from said conveyor into a second reaction zone, contacting said polyethylene in said second reaction zone with liquid higher mono-1-olefin and added organometallic reducing agent without additional metal halide under polymerization conditions, and withdrawing a polymer product of polymerized ethylene and higher mono-1-olefin from said second reaction zone.

2. The method of claim 1 in which the removal of diluent and unreacted monomer in the compression zone is accomplished by heating the upstream portion of said zone.

3. The method of claim 2 wherein said higher mono-1-olefin is propylene, said transition metal halide is titanium trichloride and said organometallic reducing agent is diethylaluminum chloride.

References Cited

UNITED STATES PATENTS 3,193,360   8/1965   Scoggin _____ 260—94.9

FOREIGN PATENTS 594,018   5/1959   Italy.

MURRAY TILLMAN, *Primary Examiner.*

D. J. BREZNER, *Assistant Examiner.*